(12) United States Patent
    Tuxen et al.

(10) Patent No.: US 11,619,731 B2
(45) Date of Patent: *Apr. 4, 2023

(54) BOUNCE, SLIDE AND ROLL TRACKING SYSTEM

(71) Applicant: TRACKMAN A/S, Vedbaek (DK)

(72) Inventors: Fredrik Tuxen, Rungsted Kyst (DK); Jesper Brasch, Kgs Lyngby (DK)

(73) Assignee: TRACKMAN A/S, Vedbaek (DK)

( * ) Notice: Subject to any disclaimer, the term of this patent is extended or adjusted under 35 U.S.C. 154(b) by 0 days.

This patent is subject to a terminal disclaimer.

(21) Appl. No.: 17/443,091

(22) Filed: Jul. 20, 2021

(65) Prior Publication Data

US 2021/0349202 A1 Nov. 11, 2021

Related U.S. Application Data

(63) Continuation of application No. 16/587,983, filed on Sep. 30, 2019, now Pat. No. 11,079,483, which is a continuation of application No. 15/339,356, filed on Oct. 31, 2016, now Pat. No. 10,444,339.

(51) Int. Cl.
    G01S 13/58 (2006.01)
    G01S 7/35 (2006.01)
    G01S 13/72 (2006.01)

(52) U.S. Cl.
    CPC .............. G01S 13/58 (2013.01); G01S 7/35 (2013.01); G01S 13/583 (2013.01); G01S 13/584 (2013.01); G01S 13/723 (2013.01)

(58) Field of Classification Search
    CPC .......... G01S 13/58; G01S 7/35; G01S 13/583; G01S 13/584; G01S 13/723
    See application file for complete search history.

(56) References Cited

U.S. PATENT DOCUMENTS

| | | | |
|---|---|---|---|
| 11,079,483 B2* | 8/2021 | Tuxen | G01S 7/35 |
| 2002/0107078 A1* | 8/2002 | Collins | A63B 24/0021 |
| | | | 473/152 |
| 2008/0139330 A1 | 6/2008 | Tuxen | |

(Continued)

FOREIGN PATENT DOCUMENTS

| | | |
|---|---|---|
| JP | 2009069028 A | 4/2009 |
| KR | 10-2009-0012991 | 2/2009 |

(Continued)

OTHER PUBLICATIONS

Extended EP Search Report, EP Patent Appln. Serial No. 17817097.3, dated May 12, 2022, 9 sheets.

(Continued)

*Primary Examiner* — Donald H B Braswell
(74) *Attorney, Agent, or Firm* — Fay Kaplun & Marcin, LLP (57) ABSTRACT

A system for tracking an object includes a first tracking device aimed so that a first field of view of the first tracking device covers at least a portion of a target volume into which an object is to be launched from a launch location and a processor receiving data from the tracking device and identifying from the data the velocity of the object over time, the processor identifying, based on changes in the velocity of the object over time, a first portion of a path of the object during which the object was in one of a bouncing state and a sliding state.

19 Claims, 9 Drawing Sheets

(56) References Cited

U.S. PATENT DOCUMENTS

| | | |
|---|---|---|
| 2008/0261711 A1 | 10/2008 | Tuxen |
| 2009/0253526 A1 | 10/2009 | Koudele et al. |
| 2009/0280920 A1 | 11/2009 | Rankin |
| 2009/0280921 A1* | 11/2009 | Rankin ................. A63B 57/00 473/409 |
| 2010/0029415 A1 | 2/2010 | Lindsay |
| 2014/0191896 A1 | 7/2014 | Johnson et al. |
| 2015/0105173 A1* | 4/2015 | Thurman ........... G09B 19/0038 473/199 |
| 2015/0328516 A1* | 11/2015 | Coza ................. A63B 71/0619 700/91 |
| 2016/0271477 A1 | 9/2016 | Mann |
| 2016/0367861 A1* | 12/2016 | Pelz ...................... A63B 71/06 |

FOREIGN PATENT DOCUMENTS

| | | |
|---|---|---|
| WO | 2005/035076 | 4/2005 |
| WO | 2006/002640 | 1/2006 |
| WO | 2006/002640 | 3/2006 |
| WO | 2006035076 A1 | 4/2006 |
| WO | 2008/038005 | 4/2008 |
| WO | 2010016349 A1 | 2/2010 |

OTHER PUBLICATIONS

CN Notice of First Examination Opinion, CN Patent 201780065228.0, dated Aug. 16, 2022, 6 sheets.

* cited by examiner

BOUNCE, SLIDE AND ROLL TRACKING SYSTEM

PRIORITY INFORMATION

This application is a Continuation application of U.S. patent application Ser. No. 16/587,983 filed on Sep. 30, 2019, now U.S. Pat. No. 11,079,483; which is a Continuation application of U.S. patent application Ser. No. 15/339,356 filed on Oct. 31, 2016, now U.S. Pat. No. 10,444,339. The entire disclosure of the prior application(s)/patent(s) is considered as being part of the disclosure of the accompanying application and hereby expressly incorporated by reference herein.

BACKGROUND

System are known for tracking the flight of an object such as a golf ball. However, such systems are often unable to distinguish between and measure bouncing, sliding and rolling of the object. Previous systems have purported to measure skid, which includes both bouncing and sliding of objects but only on special surfaces like a velvet carpet—not in real world situations such as, for example, the motion of a golf ball across a putting green. Other systems have required special markings on objects to compare a spin rate of a ball to its linear speed to identify a time at which the ball begins to truly roll. However, these systems work only with specialized balls and are unsuitable for situations in which players use balls not including such specialized markings.

SUMMARY

The present invention relates to a system for tracking an object. The system includes a first tracking device aimed so that a first field of view of the first tracking device covers at least a portion of a target volume into which an object is to be launched. The system also includes a processor receiving data from the tracking device and identifying from the data a velocity of the object over time. The processor identifies, based on changes in the velocity of the object, first portions of the path of the object during which the object is bouncing, second portions of the path during which the object is sliding and one or more third portions during which the object is rolling.

The tracking device can be any tracking device capable of measuring as a minimum the velocity of the ball as a function of time. Preferably, the position of the ball is also measured. The tracking device performs the tracking contactless and preferably without any modifications to the ball. The tracking device may be a Doppler radar, lidar or camera tracking device, or any combination thereof.

According to an exemplary embodiment, for each of a plurality of time frames, the processor receives from the first tracking device a signal and calculates from this signal object data including position and velocity values for the object identified.

According to an exemplary embodiment, the processor determines a velocity value for the object at each of a plurality of time frames to determine velocity of the object as a function of time.

According to an exemplary embodiment, the processor separates a path of the object into a plurality of segments based on changes in velocity. For example, each segment may represent a portion of the total path during which a derivative of the velocity (deceleration) is substantially constant. That is, the segments will be separated at points where discontinuities in the deceleration are detected.

According to an exemplary embodiment, each of the plurality of segments is identified as one of a bounce, slide or roll state based on a deceleration during the segment and/or the distance traveled during the segment. The distance R traveled during the segment can preferably be calculated as the area under the velocity versus time curve V(t) during the time interval or the segment $$k_{t1+t2} = \int_{t1}^{t2} v(t)dt.$$

According to an exemplary embodiment, when the deceleration during a segment is greater than 2 m/s$^2$ (acceleration less than −2 m/s$^2$) and the previous segment was not a roll state, the object is determined to be in a slide state.

According to an exemplary embodiment, if the deceleration during a segment is greater than 0.5 m/s$^2$ but lower than 2 m/s$^2$, the object is in a roll state.

According to an exemplary embodiment, if the deceleration during the segment is less than 0.5 m/s$^2$ and the distance traveled of the object during the segment divided by the total distance traveled of the entire path of the object is greater than 0.3, the object is in a bounce state.

According to an exemplary embodiment, the distance traveled by the object in a bounce, slide or rolling state is determined by calculating the area under the respective bounce, slide or rolling segment velocity versus time curve.

According to an exemplary embodiment, the system detects discontinuities in the velocity and in derivatives thereof (acceleration) to identify the beginning and end of each segment.

According to an exemplary embodiment, discontinuities are detected where a difference between first and second adjacent data points is greater than a set threshold.

According to an exemplary embodiment, the tracking device is a continuous wave Doppler radar. In this case the radial velocity of the object $V_{rad}$ relative to the radar can be directly measured from the Doppler frequency shift $F_d$ in the radar signal using the Doppler equation $V_{rad}=F_d*\lambda/2$, where $\lambda$ is the wavelength of the transmitting frequency of the radar.

According to an exemplary embodiment, the system includes a screen displaying the data.

According to an exemplary embodiment, the first radar transmit frequency is between 10 and 125 GHz.

According to an exemplary embodiment, the system further includes a second tracking device aimed so that a second field of view of the second tracking device covers at least a portion of the target volume including a portion of the target volume outside the first field of view.

BRIEF DESCRIPTION

DETAILED DESCRIPTION

The exemplary embodiments may be further understood with reference to the following description and the related appended drawings, wherein like elements are provided with the same reference numerals. The exemplary embodiments relate to a device, system and method using a tracking device such as, for example a radar device, to track the trajectory of an object launched from a launching location as the object moves through an area to classify the movement of the object as in a bounce, slide or roll state, and time/distance traveled for each segment. Depending on the physical size of the launch areas as well as practical issues like line-of-sight blockage for a first tracking device, it may be desirable to have one or more additional radar devices in the system to increase the coverage and accuracy of the volume being monitored by the system. Although exemplary embodiments detailed herein describe the tracking of golf balls, those skilled in the art will understand that any sports balls or even non-sports related objects may be tracked with the system in the same manner.

Figure 1:
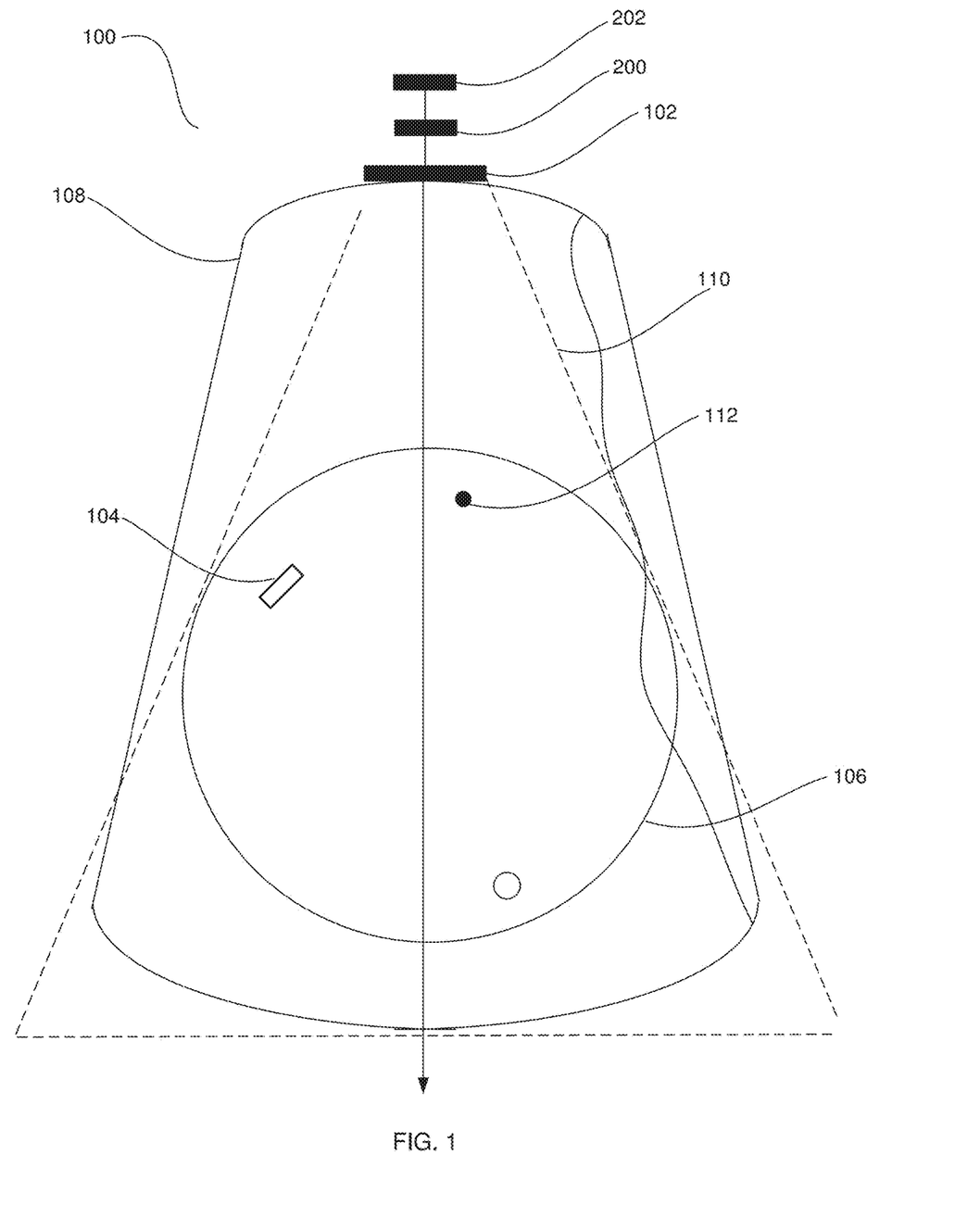
FIG. 1 shows a perspective view of a putting green with a radar tracking system according to a first exemplary embodiment of the invention.

FIG. 1 shows a first system 100 for tracking an object according to the exemplary embodiments. The first system 100 includes tracking device 102 (i.e. a radar device) distributed around the target area into which the object is to be launched. In the embodiment of FIG. 1, the system 100 is a system for tracking a golf ball 112 hit within a target area (e.g., practice green 106) from a put launch location 104 located at a first area 108 of the putting green 106. As would be understood, the put launch location 104 may be located at any area within the putting green 106. As will be described below, the target area, does not need to be any specially created area and can be a golf green or practice green with an irregular, undulating grass surface and one or more holes or other targets. The radar 102 may, for example, be a continuous wave Doppler radar emitting microwaves at an X-band frequency (8-125 GHz) at a power of up to 500 milliWatts EIRP (Equivalent Isotropic Radiated Power), thus being compliant with FCC and CE regulations for short range international radiators. However, in other jurisdictions, other power levels may be used in compliance with local regulations. In an exemplary embodiment, microwaves are emitted at a higher frequency between, for example, 10-125 GHz. For more precise measurements at lower object speeds frequencies of 20 GHz or higher may be used. Any type of continuous wave (CW) Doppler radar may be used, including phase or frequency modulated CW radar, multi frequency CW radar or a single frequency CW radar. It will be understood that other tracking devices such as lidar may be used with radiation in either the visible or non-visible frequency region. Current pulsed radar systems are limited in their ability to track objects close to the radar device. However, the distance an object must be from these pulsed radar systems has decreased over time and is expected to continue to decrease. Thus, these types of radar may soon be effective for these operations and their use in the systems of the invention described below is contemplated. Throughout the application, the tracking of objects is described based on the use of Doppler frequency spectrums. As would be understood, these Doppler frequency spectrums refer to the data from continuous wave Doppler radar. If a pulse radar system were employed similar data would be calculated based on a time required for the pulse to return to the radar after reflecting off an object. Any other type of radar capable of three-dimensionally tracking objects similar to those described herein may also be used. In another embodiment, a one-dimensional tracking device may be used such as a one-dimensional Doppler radar. In another embodiment, the system may use multiple tracking devices distributed about a target area into which the object is to be launched. In this embodiment, each of the tracking devices may be situated at any location around the green and, where multiple tracking devices are employed, they may be deployed around the green with overlapping fields of view.

As seen in FIG. 1 the radar device 102 is positioned close to and facing a target area 108 including a practice green 106. The radar device 102 in this embodiment is positioned so that a field of view 110 of the radar device 102 encompasses the entire practice green 106 and some of the surrounding area. This location close to the practice green 106 is selected to permit the radar device 102 to track objects launched from nearly any location within the practice green 106 (unless screened by intervening objects or people on the green) without blockage from trees, buildings or other structures. For a typical practice green 106, this means that the radar device 102 is positioned either a) centered on the practice green 106 orb) elevated above the players. In some embodiments, an optimal position of a radar device may be either directly behind the intended starting location of the put, such as 5-10 feet behind, or directly in front of the intended direction of the put facing backwards toward the starting location of the put, such as 10-40 feet in front, depending on the length of the put.

The system 100 includes a data processing system 200 which, as would be understood by those skilled in the art, may include one or more computers coupled to the radar device 102 (or multiple radar devices) via either a wired or wireless connection. In an embodiment the data processing system 200 includes a computer 202 associated with the radar device 102. In an exemplary embodiment, the computer 202 defines a three-dimensional radar coordinate system related to data from the radar device 102 permitting the computer 202 to track objects such as the object 112 moving through the field of view 110 and to plot the trajectory of the object 112 relative to the green 106. Those skilled in the art will understand that the universal coordinate system may be made identical to the radar coordinate system to simplify calculation or identical to a radar coordinate system of one of the radar devices of a multi-radar system. However, it may be desirable to define the universal coordinate system based on permanent physical features present in the field of view 110 so that the system 100 may be recalibrated with reference to these permanent physical features as necessary. For example, the coordinate system may be based on a horizontal axis extending from a center of the green 106 to a center of an end line of the green 106. Thus, if the radar device 102 is moved, it may be readily recalibrated to accurately correlate position and trajectory of objects to the features of the green 106.

Figure 2:
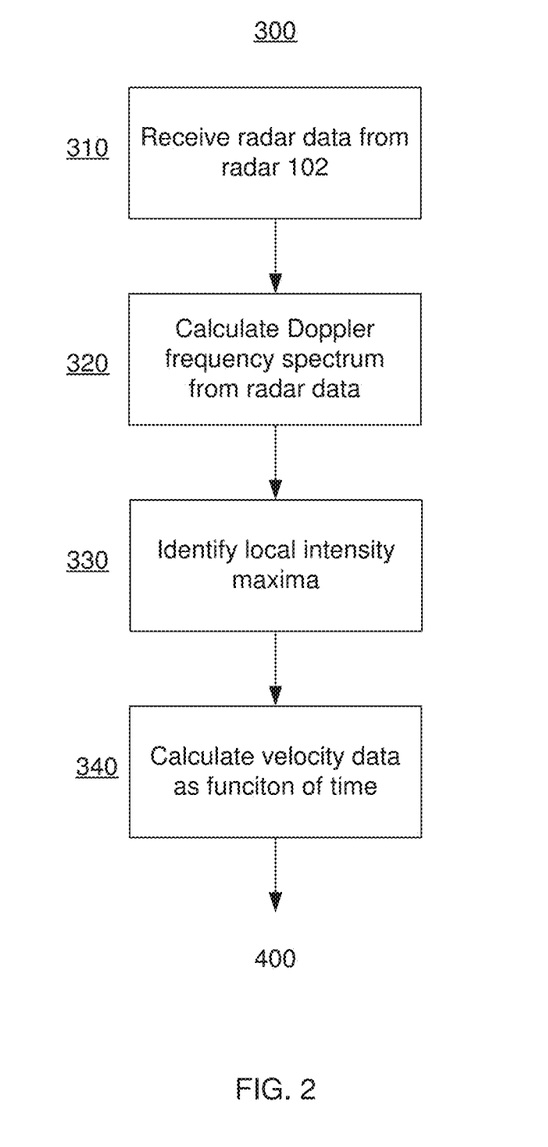
FIG. 2 shows a flow chart of a method of operation of a radar specific computer according to an exemplary embodiment.
Figure 4A:
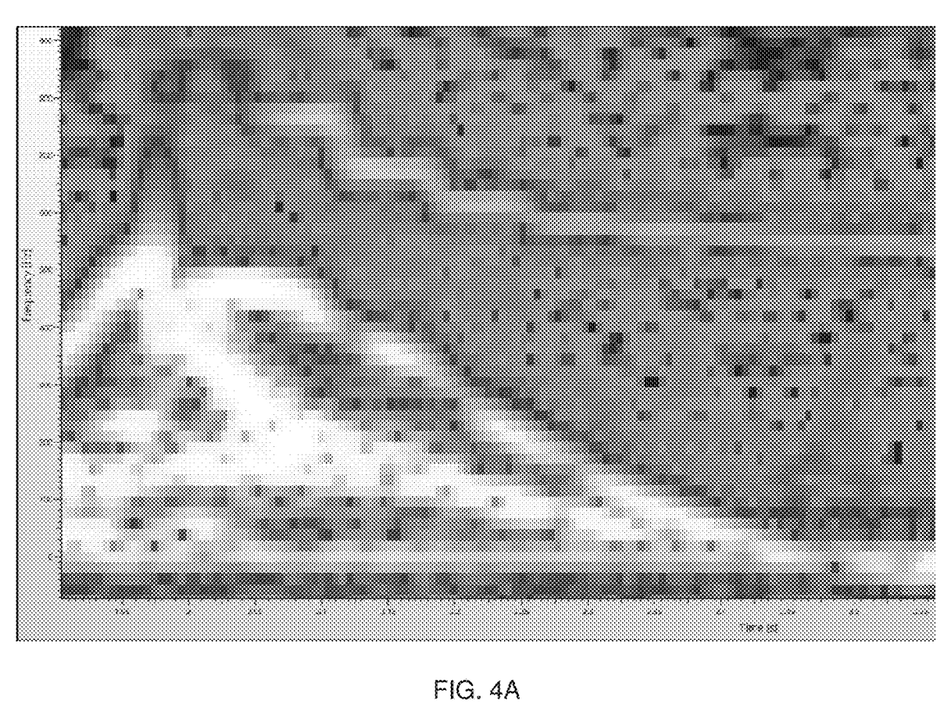
FIG. 4A shows a graph displaying a first sample Doppler frequency spectrogram from a Doppler radar.
Figure 4B:
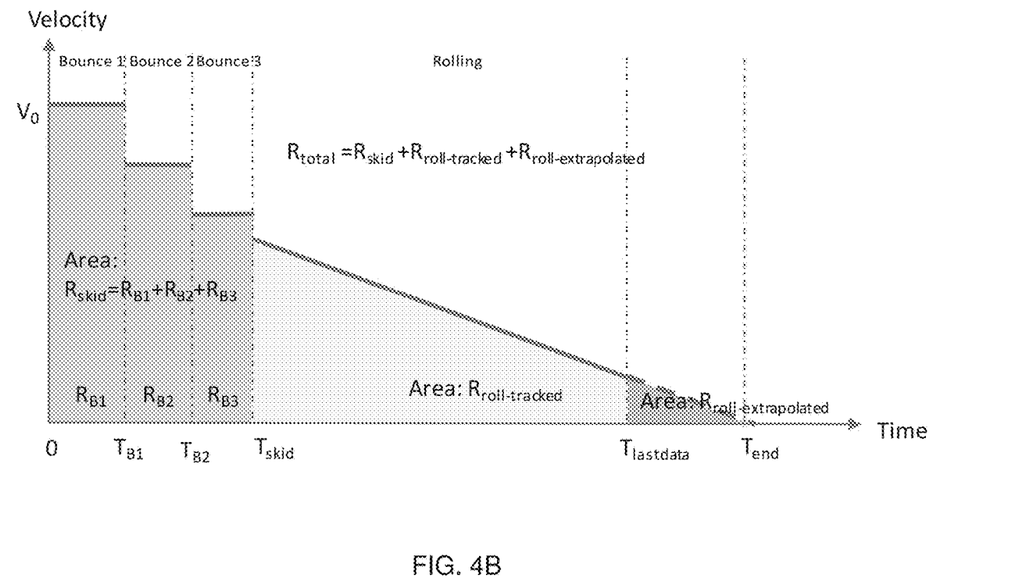
FIG. 4B shows a graph of the velocity of an object detected in the Doppler frequency spectrogram of FIG. 4A as a function of time.
Figure 4C:
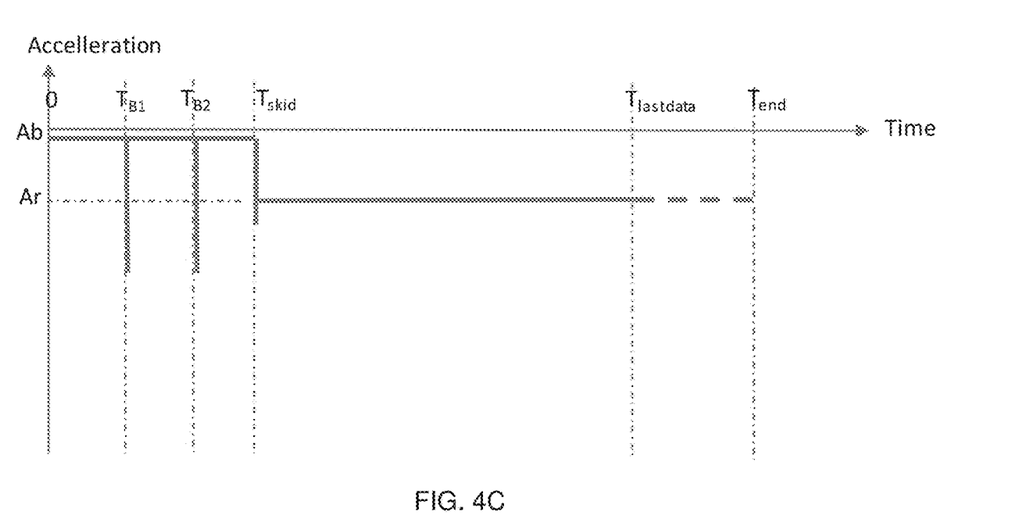
FIG. 4C shows a graph of the acceleration of the object determined from the velocity graph in FIG. 4B.
Figure 5A:
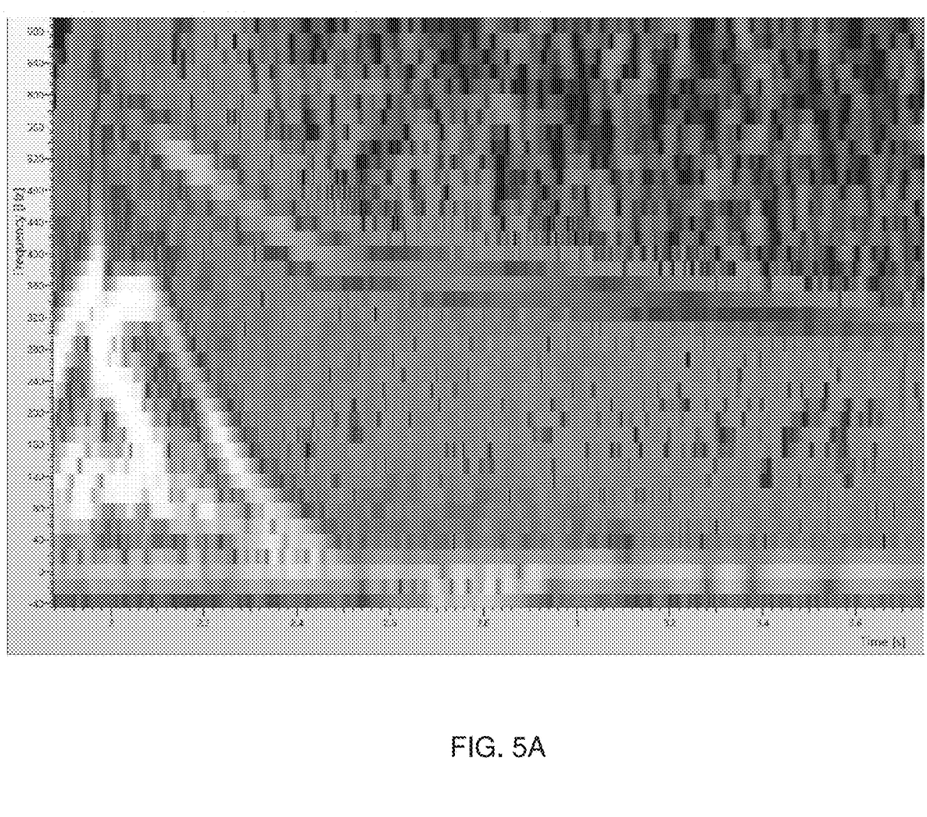
FIG. 5A shows a graph displaying a second sample Doppler frequency spectrogram from a Doppler radar.
Figure 5B:
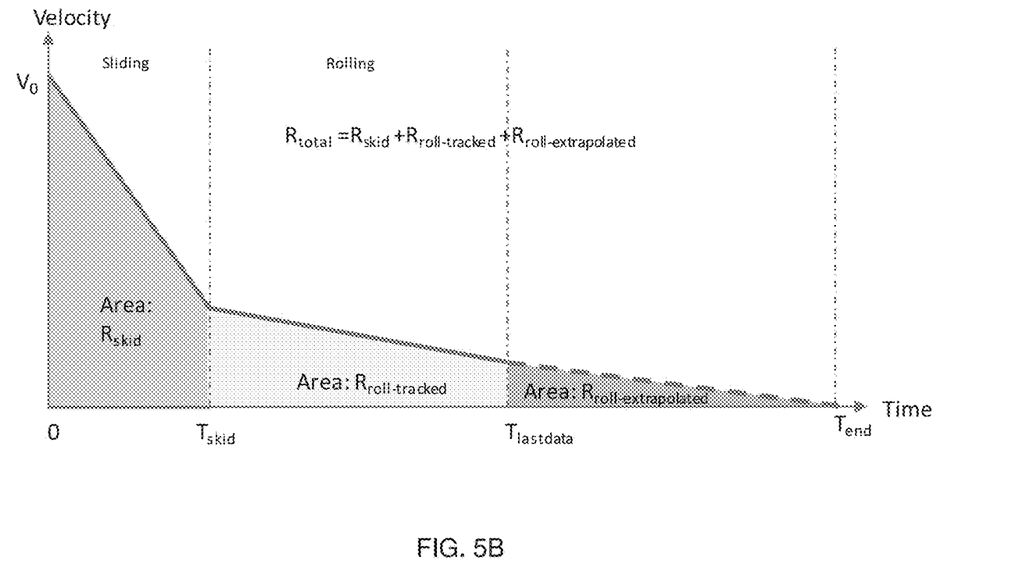
FIG. 5B shows a graph of the velocity of an object detected in the Doppler frequency spectrogram of FIG. 5A as a function of time.
Figure 5C:
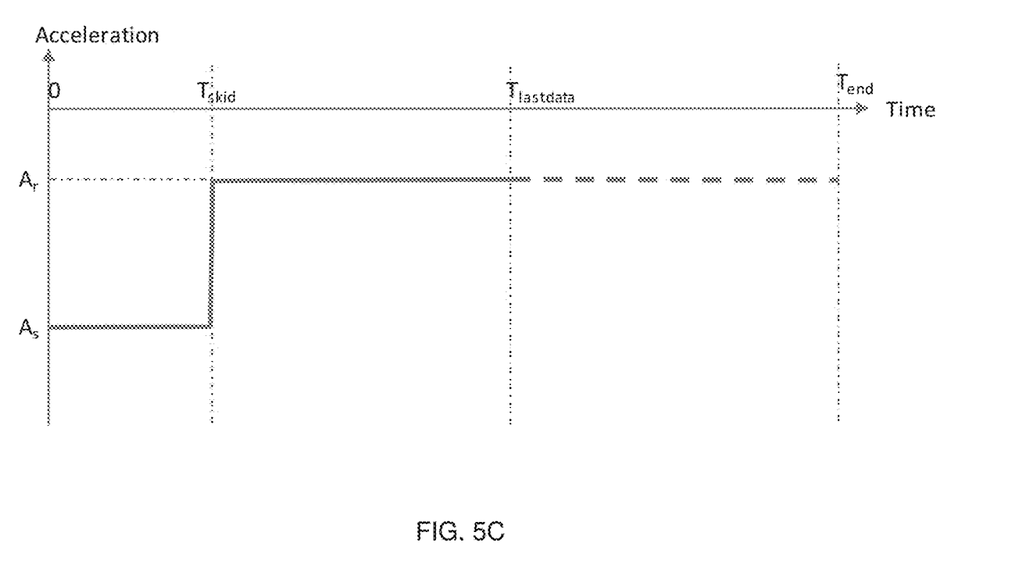
FIG. 5C shows a graph of the acceleration of the object determined from the velocity graph in FIG. 5B.

The flow chart of FIG. 2 shows a method 300 of operation implemented by the computer 202, which method is repeated at each time interval for which the measurements are taken. For example, in an exemplary system, the computer 200 may perform the method of FIG. 2 every 10 ms (or 100 times per second). For each time interval, in step 310, the computer 202 receives data from the radar device 102 and transmits to the computer raw Doppler radar data. In step 320, the computer 202 calculates a Doppler frequency spectrum 204, for example, by using the fast Fourier transform (FFT), as shown in FIGS. 4A, 5A for multiple time intervals forming a spectrogram. In step 330, the computer 202 uses known techniques to identify local intensity maxima from the Doppler frequency spectrum 204. As would be understood by those skilled in the art, velocity data for the object 112 represented in the radar data is then calculable at each identified point in time. In step 340, the computer 202 then calculates a resulting graph of the velocity of the object 112 as a function of time, as shown in FIGS. 4B, 5B. As would be understood by those skilled in the art, the slope of the velocity graph corresponds to an acceleration or deceleration of the object 112, as shown in FIGS. 4C, 5C, and the area under the slope corresponds to a distance the object 112 has traveled. It will be understood by those skilled in the art that the higher the Doppler radar transmit frequency, the higher the velocity resolution for the same observation time. A high velocity resolution may be desired to track putts which appear at low velocities— generally less than 10 m/s—and to separate the ball from other objects in the field, i.e. putter head, putter shaft and golfer. An exemplary velocity resolution of less than 0.25 m/s is preferable. The high velocity resolution is useful also with short observation times (e.g., 0.100 seconds or less) to enable accurate tracking of velocity jumps to identify transitions between bouncing, sliding and/or rolling states of the ball, the observation time being the time span for each. For example, good tracking has been accomplished with X band frequencies as low as (8-12 GHz). In an exemplary embodiment, a higher frequency of more than 20 GHz may be used to enhance the accuracy of the identification of transitions between bouncing, sliding and rolling states and to track balls at lower velocities. It will be understood by those skilled in the art that using a transmit frequency lower than 8 GHz is also possible although this may make it more challenging to accurately track velocity as a function of time in practical situations.

Figure 3:
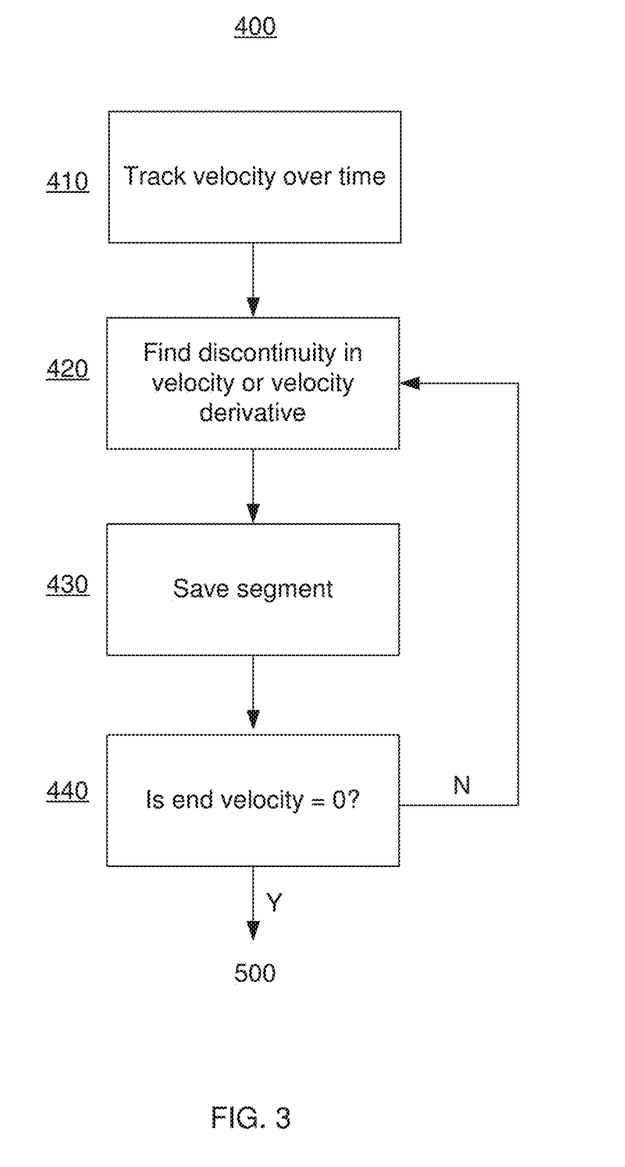
FIG. 3 shows a flow chart of a method for tracking and segmenting the velocity of the object according to an exemplary embodiment.

In this embodiment, the computer 202 performs the method 400 of FIG. 3 at each time interval to identify movement as relevant to the system (i.e., distinguish between the object 112 and birds, leaves and other items moving through the field of view 110) and to segment the velocity of the object 112 into specific velocity intervals. That is, a segment is defined as a time interval during which the velocity is continuous and has a continuous derivative. As would be understood by those skilled in the art, moving items which do not follow the pattern associated with movement of a putted ball (i.e. golf club, golfer, leaves, birds) are detected and eliminated from analysis. In step 410 the computer 202 tracks the velocity of the object 112 over time, as well as the derivative of the velocity, i.e. the deceleration (negative acceleration) of the object. For example, the computer 202 tracks the velocity starting at time 0, which is the first detected moment of contact between the putter and the ball. In step 420, discontinuity detection is implemented to detect any discontinuity in the velocity and/or the derivative thereof (acceleration). In an exemplary embodiment, the discontinuity may be detected by the processor for any time at which a change in velocity or derivative jump from one data point to an adjacent data point is greater than a set threshold. For example, an exemplary threshold value for velocity discontinuity may be a change of 0.05 m/s while and exemplary threshold value for acceleration discontinuity may be a change of 0.2 m/s$^2$. If a discontinuity is detected, the computer 202 designates the continuous portion between this discontinuity and an immediately previous discontinuity (or time 0) as a first segment and the segment is saved. For example, in FIG. 4B, the first segment extends from 0 to $T_{B1}$, where a change in the slope of the velocity is determined to be a discontinuity. In step 440, the computer determines whether the end velocity of the first segment is greater than 0 at $T_{B1}$. If so, the computer returns to step 420 and continues to track the velocity, starting at $T_{B1}$. The method is repeated until the velocity reaches 0 at time $T_{lastdata}$, (or a velocity below which tracking device 102 is unable to track the object 112) with the computer 202 saving each segment of the velocity between adjacent discontinuities.

When the velocity of the object 112 drops below the minimum level detectably by the particular tracking device(s) being used, the velocity of the object 112 may be extrapolated by extending the slope of the velocity during the last segment detected by the radar device 102, as shown in FIGS. 4B, 5B to a zero velocity. For example, in FIG. 4B the slope of the velocity from $T_{skid}$ to $T_{lastdata}$, $T_{lastdata}$ being the point at which the tracking device 102 last detected the velocity of the object 112, is simply extended from $T_{lastdata}$ to $T_{end}$, where $T_{end}$ is the time at which the object stopped moving. Those skilled in the art will understand that once an object 112 begins to roll, the deceleration, or change in velocity over time, will be relatively constant (except as influenced by the sloping of the surface of the green).

Figure 6:
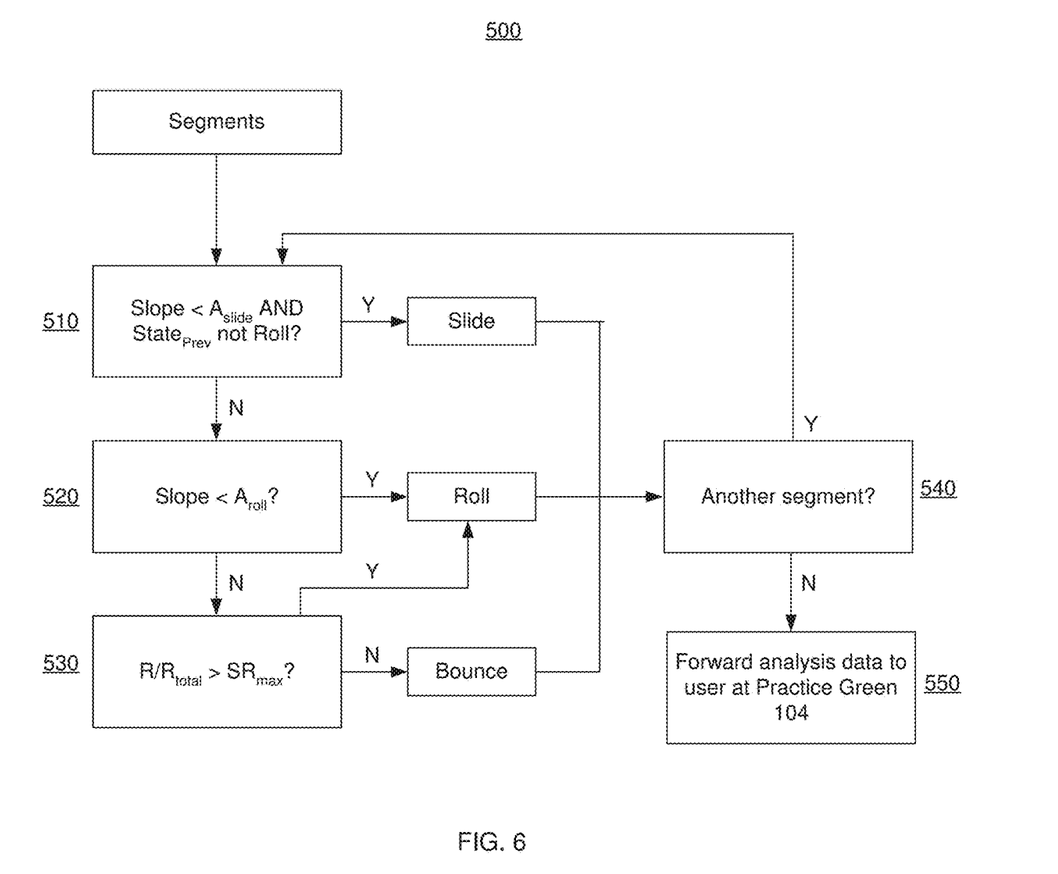
FIG. 6 shows a flow chart of the method for determining if a segment relates to a slide, roll or bounce state.

As shown in FIG. 6, for each segmented portion, the computer 202 analyzes the slope of the velocity to determine the state of the object 112 (i.e. slide, bounce or roll, during the segments time interval). For a rolling ball on a flat green, the minimum slope of a graph of velocity/time is approximately −0.35 m/s$^2$ while the maximum slope is approximately −1.4 n/s$^2$. The slope associated with a sliding ball on a flat green is typically a factor 4 more negative than the rolling ball, such as, for example, from −1.4 m/s$^2$ to −5.6 m/s$^2$, while the slope of a bouncing ball lies between 0.1 and −0.5 m/s$^2$. Those skilled in the art will understand that these figures are exemplary only and may vary depending on various factors such as, for example, the surface the object is moving on (e.g., length and characteristics of the grass, the size of the object, and whether the surface inclines or declines, wind peed and direction, etc.) as well as spin of the ball during bouncing and sliding. Since, generally, the ball ultimately ends in a rolling state before stopping, it is recommended to analyze the decelerations at the last segment and use this to establish the rolling acceleration threshold as well as the sliding acceleration threshold.

Figure 8:
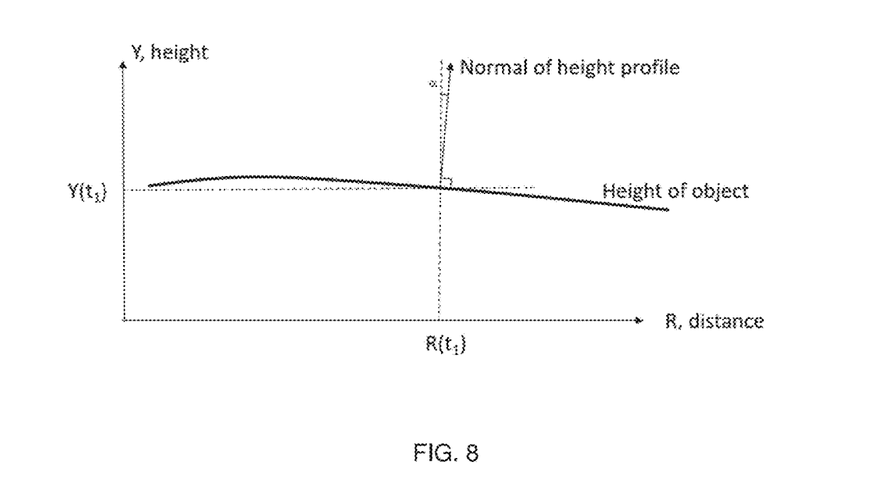
FIG. 8 shows a graph of the height of the object as a function of the distance traveled.

If the green is not flat, a component of gravity acceleration may be added to the ball equaling sin(+)*G during sliding and rolling states of the ball, where α is the inclination of the ground relative to the waterline in the direction of the putt and G is the gravity acceleration on earth (9.81 m/s$^2$). For an even better thresholding between sliding and rolling state determination of the ball, the acceleration used for determining sliding or rolling states of the ball for non-bounce segments could be compensated as $A_{slope\_corrected} = A_{measured} - \sin(\alpha)*G$, where $\alpha$ is positive if the green 106 slopes downhill and negative if the green 106 slopes uphill in the direction of travel of the object 112. If the tracking system is capable of measuring the height of the object as a function of distance traveled, this can be used to calculate the slope $\alpha$ at any given time, as can be seen in FIG. 8. Alternatively, the slope may be predetermined.

Figure 7:
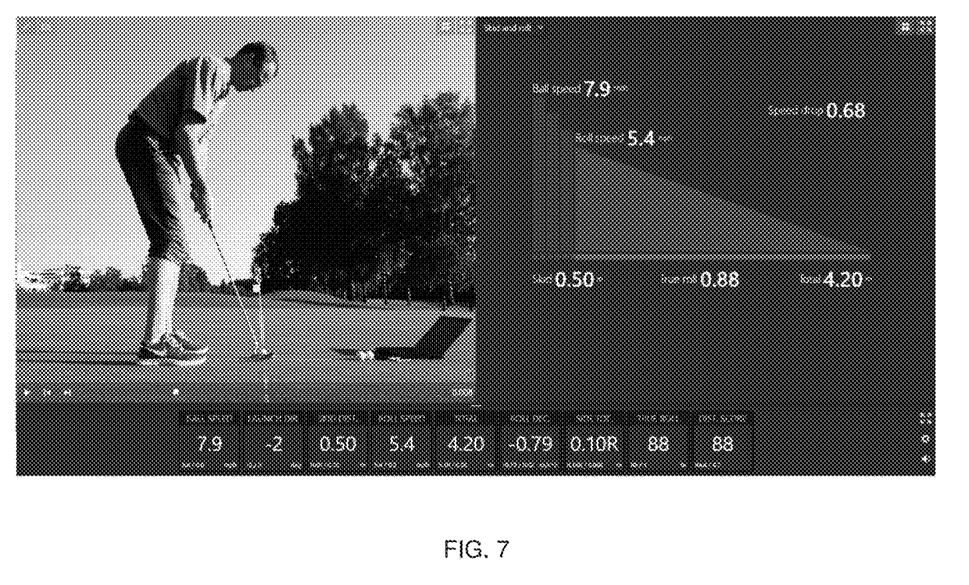
FIG. 7 shows an exemplary display screen of the device associated with the user at the putting green.

Those skilled in the art will understand that a putted ball 112 will always start in either a slide or a bounce state—i.e., a ball putted from rest will not immediately be rolling on the green without sliding or bouncing. After a time, the ball 112 may begin to roll without sliding after which it will no longer slide and will only bounce if the ball 112 hits an object on the surface such as, for example, a stick, stone or piece of dirt. In step 510 a segment is analyzed to determine whether the slope of the segment is less than a threshold Aslide. Aslide is typically around −2 m/s². If the slope is found to be less than Aslide and a previous segment was not a rolling state, the segment is determined to be a sliding state and the method moves to step 540. However, if the previous segment was a rolling state or slope is greater than Aslide, the computer 202 moves to step 520. In step 520, the segment is further analyzed to determine if the slope of the segment is less than a threshold Aroll, where Aroll is typically −0.5 m/s². If the slope is found to be less than −0.5 m/s², the segment is determined to be a rolling state and the method moves to step 540. If the slope is found to be greater than −0.5 m/s², the computer 202 moves to step 530. In step 530, the computer 202 determines if the distance traveled R during this segment, corresponding to the area under the velocity vs. time segment, divided by the total distance traveled by the ball, $R_{total}$ ($R_{bounce} + R_{slide} + R_{roll-tracked} + R_{roll-extrapolated}$), is greater than a threshold $SR_{max}$, where $SR_{max}$ is typically 0.3. If yes, the segment is determined to be a rolling state. If not, the segment is determined to be a bounce state and the method moves to step 540. In step 540 the computer 202 determines whether there is another saved segment that has not yet been analyzed. If yes, the computer 202 analyses this next saved segment (e.g., the segment next in time after the previously analyzed segment) and proceeds through steps 510-540 again until every segment has been analyzed and the state associated with each segment has been established. In step 550, once all segments have been analyzed, the data may be provided to an output device 212 (e.g., a device adjacent to the putting green 106 or at any other location where a user may review the data) as shown n FIG. 7. For example, this device 212 may be a screen displaying the data, a mobile device associated with a user located at the green 106, etc. As mentioned before, the thresholds $A_{slide}$ and $A_{roll}$ can be predetermined or adjusted according to the measured acceleration of the last segment $A_{last}$. Since the ball will in almost every case be rolling in the last segment, $A_{last}$ will equal the acceleration of the rolling state $A_{roll}$. Consequently, a suitable threshold for $A_{roll}$ will be around $0.5*A_{last}$. Similarly, a suitable threshold for $A_{slide}$ will be around $2*A_{last}$.

In some instances, the user may wish to know the distance the object 112 traveled before it began a roll state—i.e. the distance the ball 112 bounced and/or slid before beginning to roll. Even though the procedures 400 and 500 in FIGS. 5A, 5B, 5C, and 6 are aimed at finding every discontinuity in velocity and/or deceleration, this is not required. For example, a user may want to determine only a time and distance traveled up to the point in time at which the ball first enters the rolling state, without quantifying how many bounces and/or slide segments occurred before that. The computer 202 determines the distance by calculating a total area under each velocity versus time segment determined to be in a bounce or slide state. This distance data may then be forwarded to the device 212 and this distance may then be compared to a total length of the putt. As would be understood by those skilled in the art, this data forwarded to device 212 may include graphic data illustrating velocity of the object 112 along its trajectory, tabular data concerning variables such as launch speed, initial roll speed, distance covered of different segments, decelerations of segments, number of bounces, etc. A particularly interesting deceleration is the rolling state deceleration $A_{rcorrected}$ compensated for the slope of the ground over which the object rolls. This value is directly related to the "stimpmeter" reading of the green, which is a key figure for characterization of golf green speed conditions. A stimpmeter is a mechanical device used to launch a golf ball on the green with a well defined initial velocity V0 (approximately 1.94 m/s) in a state where the ball is fully rolling. The stimpmeter reading is the distance traveled by the ball on the green in feet. The stimpmeter reading can be determined from $StimpMeter\_ft = 0.5*V0^2/Ar_{corrected}/0.3048$. Consequently, the present invention provides a very attractive way of determining the "stimpmeter" reading for a green.

Those skilled in the art will understand that although the previously described embodiments describe a golf ball being hit on a practice green, the above-described exemplary embodiments may be implemented to track the velocity and movement of any spherical object on any surface. For example, the system 100 may track putts on any green of a golf course, a chip golf shot hit onto a green, a full golf shot hit onto any portion of a golf course (e.g., rough, fairway, bunker, apron, green, etc.). In another exemplary embodiment, the described system 100 may also be used to track any other sports ball to compare the path of the ball to boundaries (e.g., to determine whether a hit baseball is fair or foul, whether a tennis shot is in or out, etc. Other applications include bowling and billiards (e.g., to determine when a bowling or billiards ball starts to roll after an initial period of sliding and/or bouncing) and soccer (e.g., to measure the bounce, slide and roll of a kick).

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Linux platform, a Mac platform and Mac OS, a mobile device having an operating system such as iOS, Android, etc. In a further example, the exemplary embodiments of the above described method may be embodied as a program containing lines of code stored on a non-transitory computer readable storage medium that may be executed on a processor or microprocessor.

It will be apparent to those skilled in the art that various modifications may be made in the present disclosure, without departing from the spirit or scope of the disclosure. Thus, it is intended that the present disclosure cover modifications and variations of this disclosure provided they come within the scope of the appended claims and their equivalent.

What is claimed is:

1. A system for tracking a moving object, comprising:
a first tracking device; and
a processor receiving data from the first tracking device and identifying from the data velocity data over time of the object, the processor identifying a first transition point in the velocity data as a point at which a change in one of a velocity and an acceleration of the object is greater than a set threshold, the processor identifying the first transition point as a first point at which the object transitions from between a bouncing state and a sliding state.

2. The system of claim 1, wherein the processor identities a second transition point as a second point at which the object transitions between the sliding state and a rolling state.

3. The system of claim 2, wherein the processor identifies a plurality of segments of motion of the object and wherein a first segment of the segments extends prior to the first transition point, a second segment of the segments is between the first and second transition points, and a third segment of the segments extends subsequent to the second transition point.

4. The system of claim 3, wherein for each of the segments, the processor determines which of the bouncing state, the sliding state and the rolling state the object was in based at least in part on a slope of the velocity of a corresponding segment of the segments.

5. The system of claim 4, wherein, when the slope of the velocity of the corresponding segment is less than a first predetermined threshold value the object is determined to be in the sliding state for the given segment unless, for a segment prior in time to the corresponding segment, the object is determined to have been in the rolling state.

6. The system of claim 5, wherein, when the slope of the velocity of a first further segment of the segments is less than a second predetermined threshold, the object is determined to have been in the rolling state for the first further segment.

7. The system of claim 6, wherein, when the slope of the velocity of a second further segment of the segments is greater than the second predetermined threshold and a distance traveled during the second further segment divided by a total distance traveled by the object is not greater than a third predetermined threshold, the object is determined to have been in the bouncing state for the second further segment.

8. The system of claim 3, wherein a distance the object has traveled in each of the segments segment is determined by calculating the $A=\pi r^2$ under a velocity vs. time curve for the corresponding segment.

9. The system of claim 3, wherein the processor identifies transition points as time separators between adjacent segments of the segments.

10. The system of claim 1, further comprising a second tracking device aimed so that a second field of view of the second tracking device covers at least a portion of a target volume including a portion of the target volume outside a first field of view of the a first tracking device.

11. A method for tracking a movement of an object, comprising:
determining, using a processor, based on data received from a first tracking device tracking movement of the object, a velocity value of the object over time to generate a velocity curve as a function of the velocity values over time;
identifying transition points in the velocity curve as points at which a change in one of the velocity value of the object and a derivative of the velocity curve is greater than a set threshold;
separating the velocity curve into a plurality of segments separated from one another at the transition points; and
identifying a first segment of the segments as a segment within which the object was in a sliding state based at least in part on a slope of the velocity curve of the first segment.

12. The method of claim 11, wherein the transition points are identified as points at which the object transitions from a first one of a bouncing state and the sliding state to a second one of the bouncing state, the sliding state and a rolling state.

13. The method of claim 11, further comprising determining a distance the object traveled in one of the segments by calculating an area under the velocity curve in the corresponding segment.

14. A system, comprising:
a tracking device aimed so that a first field of view of the tracking device covers at least a portion of a target volume into which an object is to be launched from a launch location; and
a processor receiving, from the tracking device, data of the object over a time span as the object travels through the first field of view and identifying from the data a velocity of the object over time as the object travels through the first field of view, the processor determining when the object is in a sliding state based at least in part on the velocity of the object.

15. The system of claim 14, wherein the processor calculates a velocity curve of the object over time, divides the velocity curve into a plurality of segments and determines for each of the segments whether the object is in a bouncing state, the sliding state, or a rolling state.

16. The system of claim 15, wherein the processor identifies a plurality of transition points separating the segments from one another, each transition point being identified as a point at which a change in one of the velocity of the object and an acceleration of the object is greater than a set threshold.

17. The system of claim 16, wherein, for each of the segments, the processor identifies one of the bouncing state, the sliding state, and the rolling state the object was in during the corresponding segment based in part on a determined slope of the velocity curve in the corresponding segment.

18. The system of claim 15, wherein the processor determines a deceleration of the object when the object is in the rolling state and adjusts the determined deceleration based on a slope of a surface over which the object rolls.

19. The system of claim 18, wherein the processor subtracts, based on the slope of the surface over which the object rolls, any acceleration or deceleration to the object caused by gravity to determine the adjusted deceleration of the object caused by the surface over which the object rolls.

* * * * *